United States Patent
Saito

(10) Patent No.: US 7,162,685 B2
(45) Date of Patent: Jan. 9, 2007

(54) KEY-INPUT CORRECTING DEVICE

(75) Inventor: Jun'ya Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/349,749

(22) Filed: Jan. 23, 2003

(65) Prior Publication Data

US 2003/0120997 A1 Jun. 26, 2003

Related U.S. Application Data

(63) Continuation of application No. PCT/JP00/04929, filed on Jul. 24, 2000.

(51) Int. Cl.
  *H03M 13/00* (2006.01)
  *G06F 11/00* (2006.01)
  *G06F 3/02* (2006.01)

(52) U.S. Cl. .................... 714/813; 715/533

(58) Field of Classification Search ............... 714/813, 714/811; 704/3; 345/173; 178/18.01, 18.02; 715/533

See application file for complete search history.

(56) References Cited

U.S. PATENT DOCUMENTS 5,761,689 A * 6/1998 Rayson et al. ............... 715/533

FOREIGN PATENT DOCUMENTS

| JP | 01-187621 | 7/1989 |
|---|---|---|
| JP | 05-119896 | 5/1993 |
| JP | 5-119896 A | 5/1993 |
| JP | 6-214694 | 8/1994 |
| JP | 06-214694 | 8/1994 |
| JP | 6-214694 A | 8/1994 |
| JP | 08-241158 | 9/1996 |
| JP | 8-241158 A | 9/1996 |
| JP | 09-212274 | 8/1997 |
| JP | 10-124225 | 5/1998 |

OTHER PUBLICATIONS

Okamoto et al., Latest Personal Computer Terminology Dictionary, Mar. 15, 2000, 11th Edition, Second Printing, pp. 475 and 361, and partial English Translation.
International Search Report for corresponding PCT application PCT/JP00/4929 dated Oct. 16, 2000.

* cited by examiner

*Primary Examiner*—Guy J. Lamarre
(74) *Attorney, Agent, or Firm*—Staas & Halsey LLP

(57) ABSTRACT

A key-input correcting device comprises a deciding section and a changing section. The deciding section decides whether a key-input using one or more keys or buttons provided to the input unit of an electronic apparatus is valid or not. When the key-input is invalid, the changing section changes the key-input to another key-input.

41 Claims, 12 Drawing Sheets

FIG. 5

FUNCTION SEARCHING TABLE

35

| KEY INPUT INFORMATION | FUNCTION |
|---|---|
| CTRL+S | STORE FILE |
| CTRL+Q | ⋮ |
| ⋮ | ⋮ |
| | |

FIG. 6   VALID KEY SEARCHING TABLE

| KEY INPUT | SEARCHING AREA |
|---|---|
| CTRL+D | CTRL+E, CTRL+R, CTRL+S, CTRL+F, CTRL+X, CTRL+C |
| CTRL+S | CTRL+W, CTRL+E, CTRL+A, CTRL+D, CTRL+Z, CTRL+X |
| ⋮ | ⋮ |
|  |  |

FIG. 7

FIRST VALID KEY INPUT NOTIFICATION

PRESSED VALID KEY INPUT IS

| CTRL + S: STORE FILE |

| 2 | VALID KEYS EXIST NEAR PRESSED VALID KEY

| CTRL + W: COPY FILE |
| CTRL + Z: UNDO |

PLEASE DESIGNATE ANY ONE OF THE KEYS WHEN VALID KEY INPUT IS CHANGED

FIG. 8

SECOND VALID KEY INPUT NOTIFICATION

PRESSED VALID KEY INPUT IS

CTRL + Q: DELETE FILE

NO VALID KEY EXIST NEAR PRESSED VALID KEY.

FIG. 9

VALID KEY NONEXISTENCE NOTIFICATION

PRESSED KEY IS

| CTRL + F | AND IS

INVALID KEY INPUT.

NO VALID KEY EXISTS NEAR THE KEY

FIG. 11

KEY SHIFT INFORMATION TABLE

| KEY INPUT INFORMATION | CORRECTED KEY INPUT INFORMATION |
|---|---|
| CTRL+X | CTRL+S |
| ⋮ | ⋮ |

FIG. 12

KEY SHIFT INFORMATION SETTING

PRESSED VALID KEY IS [ CTRL + X ] AND IS INVALID KEY INPUT.

FOLLOWING VALID KEYS EXIST NEAR PRESSED VALID KEY

CTRL + S: STORE FILE
CTRL + Z: UNDO

PLEASE DESIGNATE ANY ONE OF THE VALID KEYS.

KEY-INPUT CORRECTING DEVICE

This application is a continuing application, filed under 35 U.S.C. §111(a), of International Application PCT/JP00/04929, filed Jul. 24, 2000.

BACKGROUND OF THE INVENTION

1. Field of the Invention

The present invention relates to a key-input correcting device for correcting a key-input using an input of an electronic apparatus.

2. Description of the Related Art

An information processing apparatus such as a personal computer (PC), a workstation (WS), a mobile computer, a PDA (Personal Digital Assistant) comprises a keyboard having a plurality of keys (or buttons). When an operation is performed by using the information processing apparatus, an operator inputs a command by using the keyboard. When this command is input, a single job or a plurality of jobs (or tasks) corresponding to the command are executed in the information processing apparatus, and a result which is intended by the operator can be obtained. Various functions held by the information processing apparatus are realized by executing a single job or a plurality of jobs corresponding to a single command input or a plurality of command inputs.

When a function of the information processing apparatus is to be executed, the following typical operations are known.

(1) A character or a character string corresponding to a command name for executing the function are input by using character input keys, and a return key (enter key) is pressed.
(2) A function key to which the function is allocated in advance (e.g., a function key, a delete key, an escape key, a space key, or the like) is pressed.
(3) A shortcut key to which the function is allocated in advance is pressed.

The "shortcut" means that, when a function of an information processing apparatus is used, the function can be realized by only one operation although a plurality of menu screens must be opened and several commands are input in a conventional method, or an operation of a pointing device such as a mouse is performed by using a keyboard. The "shortcut key" denotes a combination of keys pressed when the "shortcut" is performed (reference "2000-01 Saishin Pasokon Yougojiten" pp. 361 and 474, Gijyutsu-Hyoron Co., Ltd., Mar. 15, 2000).

When the shortcut is used, a function realized by a plurality of key-input operations of the keyboard can be realized by one key-input operation. A general shortcut key is constituted by a combination of a state change key such as a shift key ("Shift" key), an alternative key ("Alt" key), a control key ("Ctrl" key), or the like and another key. A key-input operation of the shortcut key is performed by pressing another key while pressing the state change key.

When an operator intends to execute a function by using a special key or a shortcut key (to be referred to as a "function start key" hereinafter), a key arranged near the function start key may be erroneously pressed.

In this case, it is decided by the decision in the information processing apparatus for the pressed key that no function is allocated to the pressed key (invalid key-input), any process is not performed (key-input is neglected).

On the other hand, when a function different from a function intended by the operator is allocated to the pressed key (when another function start key is erroneously pressed), the key-input itself is valid. For this reason, the function allocated to the key is executed, and a result which is not intended by the operator is obtained.

Therefore, when the operator erroneously press the function start key, the operator must newly depresses the correct function start key, or the operator must press the correct function key after the state is returned to the state in which the erroneously executed function is executed.

In this manner, in the conventional technique, interruption or restart of an operation caused by erroneously pressing a function start key may occur. This problem can be made conspicuous as the size of an input unit decreases with respect to the size of a body part (e.g., a finger).

SUMMARY OF THE INVENTION

It is an object of the present invention to provide a key-input correcting device which can prevent interruption or restart of an operation caused by an erroneous key-input.

The present invention employs the following configuration to achieve the above object.

More specifically, the present invention is a key-input correcting device including deciding means for deciding whether a key-input using a single key or button or a plurality of keys or buttons arranged in an input unit of an electronic apparatus is valid or not; and changing means for, when the key-input is invalid, changing the corresponding key-input into another valid key-input.

In the present invention, the "valid key-input" denotes a key-input to which a function is allocated, and the "invalid key-input" denotes a key-input to which a function is not allocated.

In the present invention, one key-input is preferably changed into another key-input. The key-input and the other key-input in the present invention are preferably key-inputs of a shortcut key or a function key.

The key-input correcting device according to the present invention can be applied to all electronic apparatus having input units in which a plurality of keys and/or buttons. The electronic apparatus include, e.g., computers having input units such as a personal computer, a workstation, a mobile computer, and a PDA, of the like, an OA machine (a telephone set, a mobile phone, a facsimile, a copying machine, a printer, a calculator, or the like), an AV machine (a television set, a VTR, an MD/CD/DVD, a player, or the like), and a home electric appliance (an air conditioner, or the like).

The input units include a unit such as a keyboard on which physical keys and/or buttons are arranged and units such as a digitizer, a tablet, and a touch panel in which key-inputs are performed such that keys and/or buttons displayed on display units are touched with touch pens or fingers. More specifically, in the present invention, a pressed key or button can be specified regardless of the configuration of an input unit.

The key-input correcting device may be arranged in an electronic apparatus body, or may be arranged in an input unit of an electronic apparatus. The electronic apparatus body and the input unit may be integrally constituted, maybe connected to each other through a communication cable (signal line), or may be separately constituted to be communicated with each other. For this reason, the input unit also includes a remote controller of the electronic apparatus.

BRIEF DESCRIPTION OF THE DRAWINGS

FIG. 5 is a diagram showing an example of a function retrieving table;

FIG. 6 is a diagram showing an example of a valid key retrieving table;

FIG. 7 is a diagram showing a display of a first valid key-input notification screen;

FIG. 8 is a diagram showing a display of a second valid key-input notification screen;

FIG. 9 is a diagram showing a display of a valid key nonexistence notification screen;

FIG. 11 is a diagram showing an example of a key shift information table; and

FIG. 12 is a diagram showing a display of a key shift information setting screen.

DESCRIPTION OF THE PREFERRED EMBODIMENTS

Embodiments of the present invention will be described below with reference to the accompanying drawings.

<Hardware Configuration>

Figure 1:
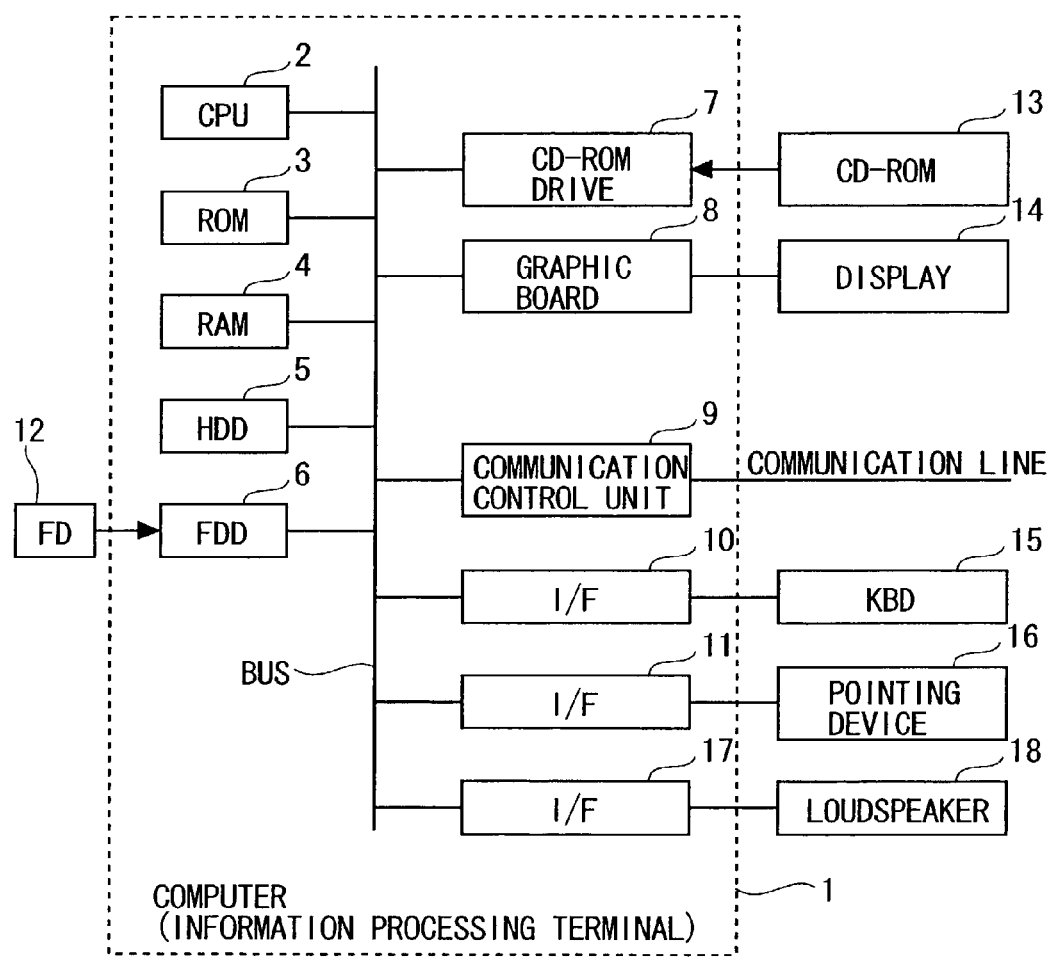
FIG. 1 is a block diagram showing a hardware configuration of a computer functioning as a key-input correcting device.

FIG. 1 is a block diagram showing a hardware configuration of a computer (information processing terminal) 1 functioning as a key-input deciding device according to the present invention. The computer 1 is constituted by a PC or a WS.

Referring to FIG. 1, the computer 1 includes a CPU (Central Processing Unit) 2, a ROM (Read Only Memory) 3, a RAM (Random Access Memory) 4, a hard disk driver (HDD: including a hard disk (HD) 5a) 5, a floppy disk drive 6, a CD-ROM drive 7, a graphic board 8, a communication control unit 9, and interface circuits (I/F) 10 and 11 which are connected to each other with a BUS.

A display unit 14 such as a cathode ray tube (CRT) or a liquid crystal display (LCD) is connected to the graphic board 8. A keyboard (KBD) 15 is connected to the I/F 10. A pointing device (PD) 16 such as a mouse, a track ball, a flat space, or a joystick are connected to the I/F 11.

The ROM 3 stores a starting program therein. The starting program is executed by the CPU 2 when the computer 1 is powered on. In this manner, an operating system (OS) stored in the HD 5a and a single driver or a plurality of drivers for a display process or a communication process are loaded on the RAM 4, so that various processes and controls can be executed.

In the RAM 4, a program for controlling the computer 1 is developed. The RAM 4 holds a process result obtained by the program, temporary data for the process, display data for displaying the process result or the like on the screen of the display unit 14, and the like therein. The RAM 4 is used as a work area for the CPU 2.

The display data developed on the RAM 4 is transmitted to the display unit 14 through the graphic board 8, and the display unit 14 displays display contents (texts, images, and the like) corresponding to the display data on the screen of the display unit 14.

The hard disk driver 5 is a device which records a program, control data, text data, image data, and the like on the hard disk according to a direction of the CPU 2 and which reads these data.

The FDD 6 reads or writes a program, control data, text data, image data, and the like on a floppy disk (FD) 12 according to a direction of the CPU 2.

The CD-ROM drive 7 reads a program or data recorded on a CD-ROM (read-only memory using a compact disk) 13 according to a direction of the CPU 2.

The communication control unit 9 transmits and receives data to/from another unit according to a direction of the CPU 2 by using a communication line (communication circuit) connected to the computer 1 or uploads or downloads a program or data.

The KBD 15 includes a plurality of keys (character input keys, cursor keys, function keys, special keys, and the like), and is used when an operator inputs data in the computer 1. The PD 16 is used to input a direction using a cursor displayed on the display unit 14.

The pointing device (PD) 16 executes various programs (an OS and an application) stored in the ROM 3, the HD 5a, the FD 12, and the CD-ROM 13 which corresponds to a recording medium of the present invention, and gives a direction to each constituent element in the computer 1 to control the operations of the computer 1 and the peripheral units 13 to 16. In this manner, the computer 1 functions as a key-input correcting device according to the present invention.

The program or data held in the recording medium such as the HD 5a may be held in advance, and a program or data downloaded by another unit may be held in the recording medium.

<Function Block of Key Input Judging Section>

Figure 2:
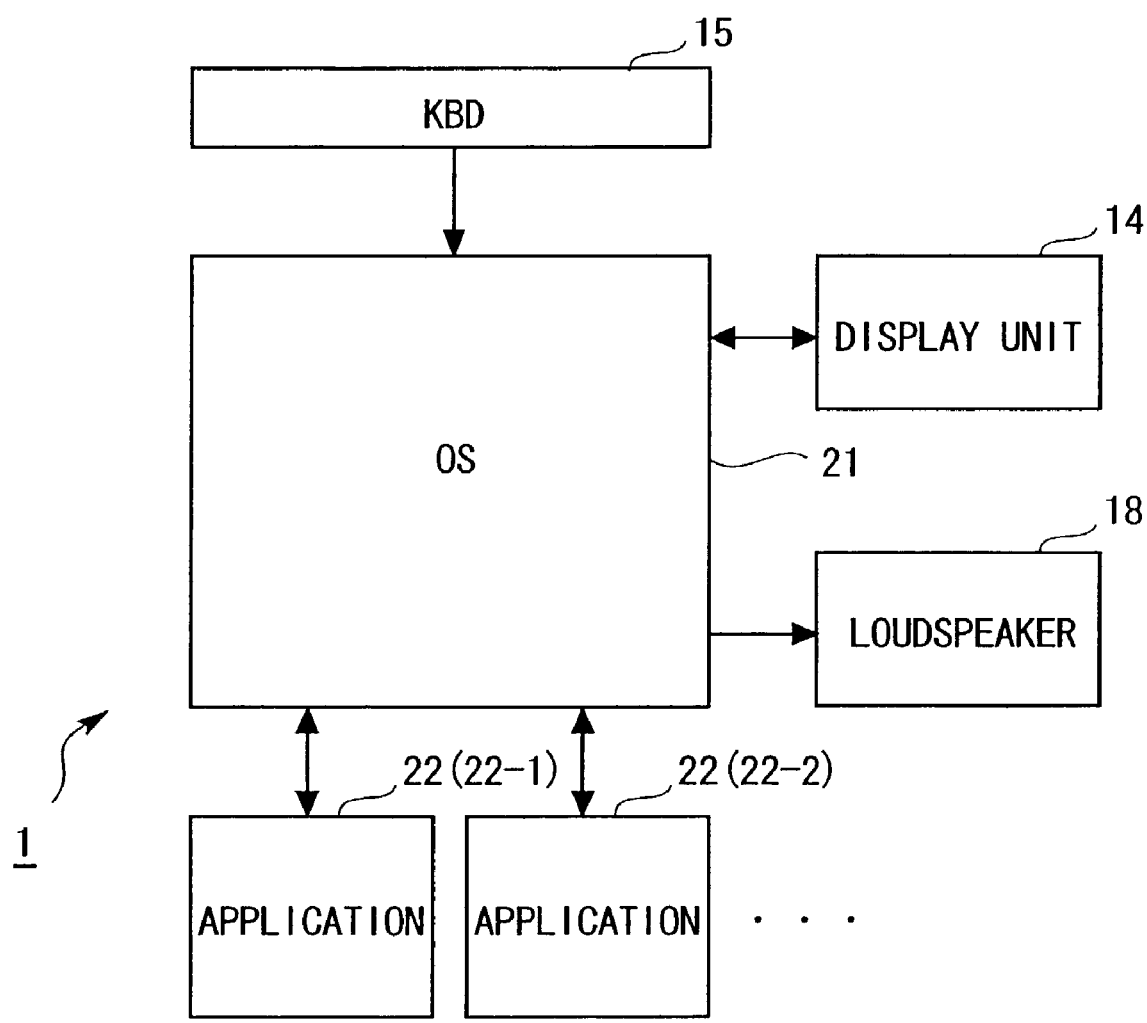
FIG. 2 is a functional block diagram of the computer shown in FIG. 1.

FIG. 2 is a functional block diagram of the computer 1 shown in FIG. 1. The computer 1 functions as a device having an OS 21 and n (n=1, 2, . . . , n−1, n) applications (22-1, 22-2, . . . , 22-n) 22 such that the CPU 2 loads the program recorded on the recording medium such as the HD 5a on the RAM 4 (main memory) and execute the program.

The OS 21 allocates resources (the CPU 2, the RAM 4 (main memory), and the like) to jobs executed by the OS 21 and the applications 22, controls file management and input/output devices (the display device 14, the KBD 15, a loudspeaker 17, and the like), and performs error detection or the like.

In particular, the OS 21 analyses a function allocated to a key-input by using the KBD 15 on the basis of key-input information (specific information of the pressed key or button) input from the KBD 15 and executes the analyzed function, or gives an execution command of the analyzed function to a corresponding application 22. The key-input information is a key code (scan code) corresponding to the pressed key or a combination of the pressed keys, specific information of a key or a button based on coordinate information, or the like.

In this manner, the function corresponding to the key-input is executed by the OS 21 or the application 22. Thereafter, the OS 21 outputs an execution result of the function obtained by the OS 21 or the application 22 under the control of the display unit 14 or a loudspeaker 18.

The applications 22 controls the functions of a wordprocessor, a spreadsheet, file management, and the like, executes the corresponding functions according to execution commands given by the OS 21, and gives the execution results to the OS 21.

Figure 3:
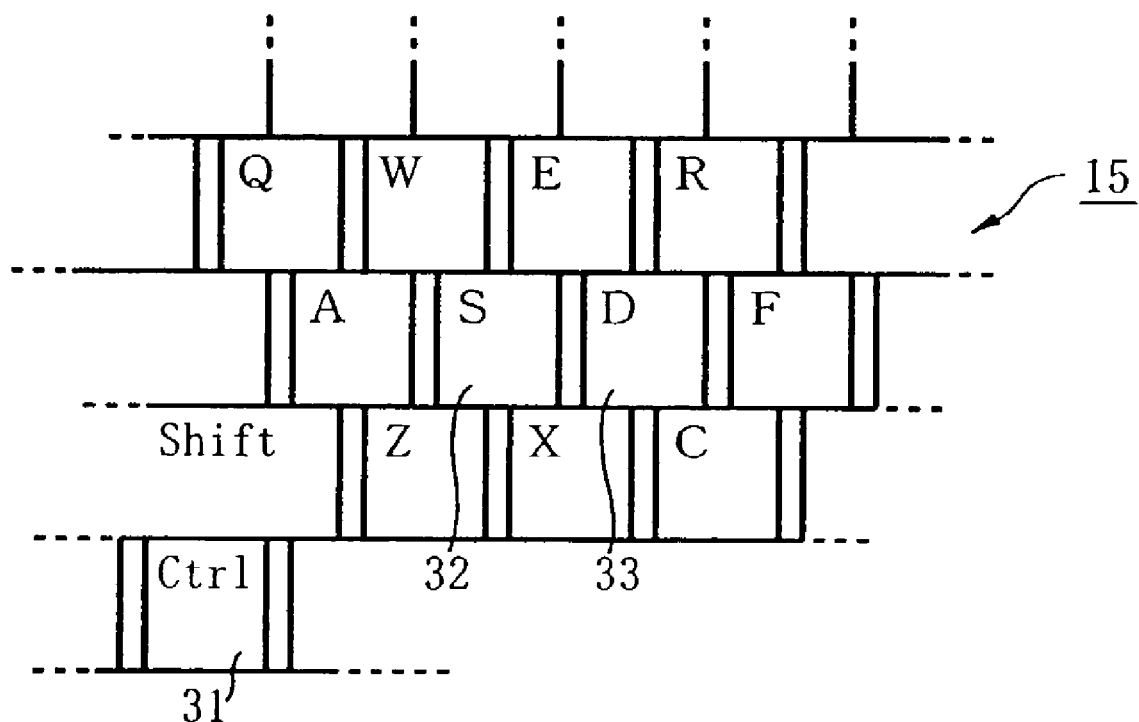
FIG. 3 is a diagram showing an example of a keyboard.

FIG. 3 is a diagram showing some of a plurality of keys arranged on the KBD 15 in this embodiment. As shown in FIG. 3, on the KBD 15, a plurality of character input keys and a control key ("Ctrl" key) 31 which is one of state change keys are arranged. The state change key is one of special keys.

In the key group shown in FIG. 3, a plurality of shortcut keys serving as function start keys are arranged to execute various functions held by the applications 22 (e.g., the application 22-1) by an easy operation.

In this embodiment, the shortcut key is constituted by a combination of the "Ctrl" key 31 and an arbitrary key. When the specific character key is pressed while pressing the "Ctrl" key 31, an key-input of a valid shortcut key is performed, and the function of the application 22-1 corresponding to the key-input is executed.

In this example, a function "delete file" is allocated to a combination ("Ctrl"+"Q") between the "Ctrl" key 31 and "Q" key, a function "copy file" is allocated to a combination ("Ctrl"+"W") between the "Ctrl" key 31 and "W" key, a function "store file" is allocated to a combination ("Ctrl"+"S") between the "Ctrl" key 31 and an "S" key 32, and a function "undo" is allocated to a combination ("Ctrl"+"Z") between the "Ctrl" key 31 and "Z" key.

In this manner, for example, when the "Ctrl"+"S" are pressed, the function "store file" held by the application 22-1 is executed. More specifically, the key-input of "Ctrl"+"S" is a key-input of a valid shortcut key (function start key)

In contrast to this, no functions are allocated to the combinations of the "Ctrl" key 31 and other keys ("E" key, "R" key, "A" key, a "D" key 33, "F" key, "X" key, and "C" key) shown in FIG. 3. More specifically, key-inputs performed by the combinations of these keys are invalid key-inputs.

The OS 21 executes a key-input correcting process (key-input correcting function). When a function corresponding to a key-input is analyzed, the key-input is invalid, a valid key-input is allocated to the invalid key-input.

However, the OS 21 has a flag (not shown) corresponding to the key-input correcting process. This flag can be set in any one of the states of "ON (valid)" and "OFF (invalid)" by an operator of the computer 1. The OS 21 executes the key-input correcting process when the flag is "valid".

For example, no function is allocated to a combination of "Ctrl"+"D". For this reason, an operation in which a "D" key 33 is pressed while pressing the "Ctrl" key 31 is essentially invalid key-input. In contrast to this, the OS 21 corrects the key-input of "Ctrl"+"D" by a key-input correcting process as if the "Ctrl"+"S" keys are pressed.

<Key Input Correction Process>

Figure 4:
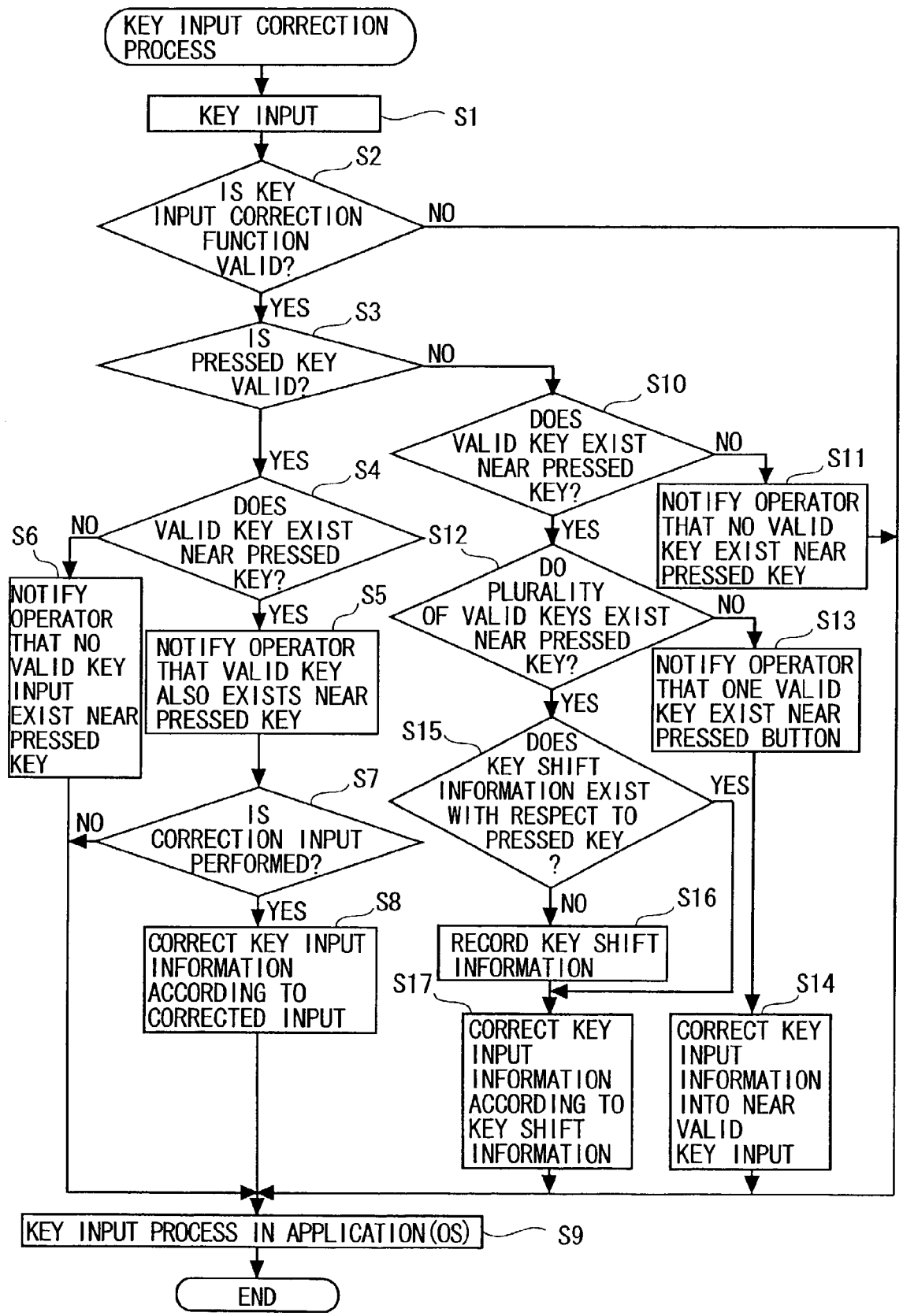
FIG. 4 is a flow chart showing a key-input correcting process.

FIG. 4 is a flow chart showing a key-input correcting process executed by the OS 21. As an assumption, for example, the OS 21 and anyone of the applications 22 (e.g., the application 22-1) are started for an operation of an operator.

First, it is assumed that the operator of the computer 1 performs a key-input (key-input of a function start key) to execute the function of the application 22-1 (S1). In this manner, key-input information corresponding to the pressed key or the combination of the pressed keys is input from the KBD 15 to the OS 21.

When the OS 21 receives the key-input information, the OS 21 decides whether the key-input correcting function is valid or not (S2). More specifically, the OS 21 refers to the flag (not shown) of the key-input correcting process described above to decide whether the flag is "valid" or not. At this time, when the flag is valid (S2; Y), the OS21 considers that the key-input correcting function is valid, the process shifts to step S3. When the flag is invalid (S2; N), the OS 21 understands that the key-input correcting function is invalid, and the process shifts to step S9.

In step S9, a key-input process in the applications 22 or the OS 21 is executed. More specifically, when the process shifts to step S9 through step S2, the OS 21 executes a function corresponding to the key-input information as in the conventional technique. More specifically, when the function is allocated to the key-input, the function is executed. When no function is allocated to the key-input, the key-input is neglected.

On the other hand, when the process shifts to step S3, the OS 21 decides on the basis of the key-input information whether the pressed key is valid or not. More specifically, the OS 21 retrieves a function retrieving table 35 shown in FIG. 5 by using the key-input information as a key. As shown in FIG. 5, the function retrieving table 35 holds the information of a function corresponding to the key-input information, and the OS 21 reads the information of the corresponding function from the function retrieving table 35.

Therefore, when the information of the function corresponding to the key-input information can be read, the OS 21 decides that a function is allocated to the key-input (valid key-input), and shifts the process to step S4.

In contrast to this, when the information of the function corresponding to the key-input information does not exist in the function retrieving table 35 (the information of the corresponding function cannot be read), the OS 21 decides that no function is allocated to the corresponding key-input (invalid key-input) (S3; N), and shifts the process to step S10.

When the process shifts to step S4, the OS 21 decides whether a valid key exists in a predetermined area (e.g., neighborhood) of a pressed key or not. More specifically, the OS 21 retrieves for a valid key-input by using the function retrieving table 35 shown in FIG. 5 and a valid key retrieving table 36 shown in FIG. 6.

As shown in FIG. 6, the valid key retrieving table 36 holds single key-input information or other pieces of key-input information which are correlated to a certain key-input. In this example, the other pieces of key-input information existing in a retrieving area (area in which it is decided whether a valid key-input exists or not) of a valid key-input corresponding to the key-input information are held. As the retrieving area, pieces of key-input information obtained by combinations of all character input keys adjacent to a character input key for performing a key-input and the "Ctrl" key are set.

In FIG. 6, for the key-input information of "Ctrl"+"D" pieces of key-input information of "Ctrl"+"E", "Ctrl"+"R", "Ctrl"+"A", "Ctrl"+"D", "Ctrl"+"Z" and "Ctrl"+"X" are set as a retrieving area.

The held contents (allocation of functions to shortcut keys) of the function retrieving table 35 are subjected to an initial setting by a vender. However, the allocation can also be appropriately set by an operator (user). The retrieving area of the valid key retrieving table 36 is also subjected to an initial setting by the vender. However, the retrieving area can also be appropriately set by the operator (user) of the computer 1. More specifically, when a single key-input or a plurality of key-inputs which are subjected to the decision for deciding whether the key-inputs are valid or not are directed, a certain key-input can be correlated to another key-input or a plurality of other key-inputs.

The OS 21 reads a retrieving area corresponding to the key-input information from the valid key retrieving table 36, the OS 21 decides whether a function is allocated to each key-input included in the retrieving area or not by the same method as that in step S3 using the function retrieving table 35.

In this manner, the OS 21 lists valid key-inputs in the retrieving area. When the OS 21 detects at least one valid key-input in the retrieving area (S4; Y), the OS 21 shifts the process to step S5. When the OS 21 cannot detects a valid key-input in the retrieving area (S4; N), the OS 21 shifts the process to step S6.

When the process shifts to step S5, the OS 21 notifies an operator that a valid key also exists near a pressed key. More specifically, the OS 21 displays a first valid key-input notification screen (first valid key-input notification window) 37 shown in FIG. 7 on the screen of the display unit 14 on the basis of the key-input information and the decision result) At the same time, the OS 21 outputs a predetermined voice for calling operator's attention from the loudspeaker 18.

As shown in FIG. 7, the first valid key-input notification screen 37 displays, as a list of key-inputs which can be selected and specified by an operator, a pressed valid key-input, a function name allocated to the key-input, the valid key-inputs listed by the process in step S4, and function names allocated to the listed valid key-inputs.

In the example shown in FIG. 7, the first valid key-input notification screen 37 obtained when the "Ctrl"+"S" keys are pressed as a key-input is displayed, and "Ctrl"+"W" (function "copy file") and "Ctrl"+"Z" (function "undo") are displayed as other valid key-inputs existing near the "Ctrl"+"S" keys (retrieving area).

The OS 21 displays the first valid key-input notification screen 37 on the display unit 14 for a predetermined period of time (e.g., several seconds to several ten seconds) by using a timer (not shown) arranged in the computer 1. Meanwhile, the operator can changes valid key-inputs by using the first valid key-input notification screen 37.

More specifically, the operator can direct another valid key-input displayed on the first valid key-input notification screen 37 with a mouse cursor operation (mouse click) by the PD 16 or a cursor direction (cursor direction+"Enter") performed by operating the KBD 15. In contrast to this, when the operator does not desire to change the key-inputs, the OS 21 directs an original key-input displayed on the first valid key-input notification screen 37 with an operation of the KBD 15 or the PD 16, or waits until a predetermined period of time has elapsed.

When the timer measures the predetermined period of time, the OS 21 shifts the process to step S7. The OS 21 closes the first valid key-input notification screen 37 and then decides whether a direction (corrected input) of another valid key-input is input within the predetermined period of time or not. At this time, when the corrected input is made (S7; Y), the process shifts to step S8. When no corrected input is made (S7; N), the process shifts to step S9. The case in which "no corrected input is made" also includes a case in which the original key-input is directed.

When the corrected input is made within the predetermined period of time, the first valid key-input notification screen 37 may be closed before the predetermined period of time has not elapsed, and the process may shift to step S8. When the original key-input is directed on the first valid key-input notification screen 37, the process may shift to step S9 while skipping the processes in steps S7 and S8.

When the process shifts to step S8, the OS 21 corrects the key-input information into the key-input information directed by the corrected input. More specifically, the OS 21 changes the original valid key-input into a key-input (another specified key-input) directed by using the first valid key-input notification screen 37. Thereafter, the OS 21 shifts the process to step S9.

When the process shifts to step S6, the OS 21 notifies the operator that no valid key-input exists in the vicinity of the pressed key. More specifically, the OS 21 displays a second valid key-input notification screen (second valid key-input notification window) 38 shown in FIG. 8 on the screen of the display unit 14 on the basis of the key-input information and the decision result in step S4. At the same time, the OS 21 outputs a predetermined voice for calling operator's attention from the loudspeaker.

As shown in FIG. 8, the second valid key-input notification screen 38 displays a pressed valid key-input, a function name allocated to the key-input, a fact that no valid key exists in the vicinity of the valid key-input (in the retrieving area). In the example shown in FIG. 8, the second valid key-input notification screen 38 obtained when the "Ctrl"+"Q" keys are pressed as a key-input is displayed.

The OS 21 displays the second valid key-input notification screen 38 on the display unit 14 until the timer (not shown) measures a predetermined period of time (e.g., several seconds to several ten seconds). Thereafter, when the timer measures the predetermined period of time, the OS 21 closes the second valid key-input notification screen 38 to shift the process to step S9.

When the operator inputs a direction to close the second valid key-input notification screen 38 before the predetermined period of time has elapsed, the second valid key-input notification screen 38 can be immediately closed even though the predetermined period of time has not elapsed to shift the process to step S9.

When the process shifts to step S9 through steps S6, S7, and S8, the OS 21 generates an execution command of the function corresponding to a key-input directed by the original valid key-input or a corrected input and gives the execution command to the application 22-1.

In this case, the application 22-1 executes the function (single job or a plurality of jobs) corresponding the execution command and gives the execution result to the OS 21. The OS 21 displays the execution result of the function on the display unit 14, or outputs the voice corresponding to the execution result from the loudspeaker 18. In this manner, the operator can obtain the execution result of the function of the desired application 22-1.

On the other hand, when the process shifts to step S10, the OS 21 decides whether a valid key exists in the vicinity of the pressed key or not. More specifically, the OS 21 performs the same process as that in step S4, detects a valid key-input from a predetermined retrieving area corresponding to the corresponding invalid key-input by using the valid key retrieving table 36 and the function retrieving table 35. At this time, when at least one valid key-input is detected (S10; Y), the process shifts to step S12. When at least one valid key-input is not detected (S10; N), the process shifts to step S11.

When the process shifts to step S11, the OS 21 notifies the operator that no valid key exists in the vicinity of the pressed key. More specifically, the OS 21 displays a valid key nonexistence notification screen (valid key nonexistence notification window) 39 shown in FIG. 9 on the screen of the display unit 14. At the same time, the OS 21 outputs a predetermined voice for calling operator's attention from the loudspeaker 18.

As shown in FIG. 9, on the valid key nonexistence notification screen 39, a fact that the key-input is invalid and a fact that no valid key exists in the vicinity of the valid key-input (in the retrieving area). In the example shown in FIG. 9, the valid key nonexistence notification screen 39 obtained when the "Ctrl"+"F" keys are pressed as a key-input is displayed.

The OS 21 displays the valid key nonexistence notification screen 39 on the display unit 14 until the timer (not shown) measures a predetermined period of time (e.g., several seconds to several ten seconds). Thereafter, when the timer measures the predetermined period of time, the OS 21 closes the valid key nonexistence notification screen 39 to shift the process to step S9.

When the operator inputs a direction to close the valid key nonexistence notification screen 39 before the predetermined period of time has elapsed, the valid key nonexistence notification screen 39 can be closed even though the predetermined period of time has not elapsed to shift the process to step S9.

When the process shifts to step S9 through step S11, the OS 21 neglects the corresponding key-input because no valid key-input exist.

On the other hand, when the process shifts to step S12, the OS 21 decides whether a plurality of valid keys exist in the vicinity of the pressed key. More specifically, the OS 21 decides whether a plurality of valid key-inputs detected by the process in step S10 exist or not. At this time, when the number of valid key-input is one (S12; N), the process shifts to step S13. When the number of valid key-inputs is two or more (S12; Y), the process shifts to step S15.

When the process shifts to step S13, the OS 21 notifies the operator that one valid key exists in the vicinity of the pressed key. More specifically, the OS 21 displays a valid key existence notification screen (valid key existence notification window) 40 shown in FIG. 10 on the screen of the display unit 14. At the same time, the OS 21 outputs a predetermined voice for calling operator's attention from the loudspeaker 18.

Figure 10:
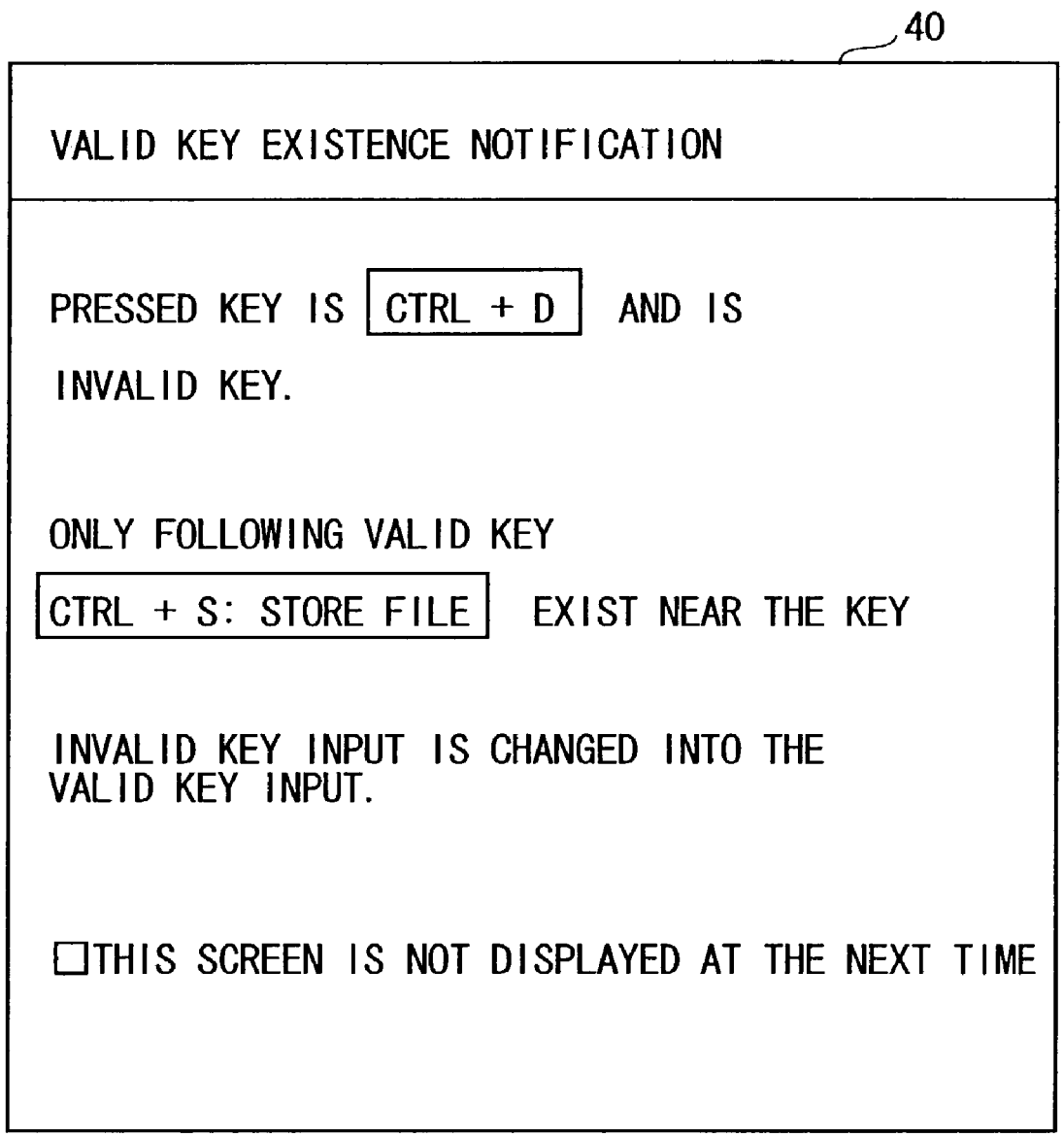
FIG. 10 is a diagram showing a display of a valid key existence notification screen.

As shown in FIG. 10, the valid key existence notification screen 40 displays a fact that the key-input is invalid and a fact that one valid key exists in the vicinity of the valid key-input (in the retrieving area) In the example shown in FIG. 9, the valid key nonexistence notification screen 39 obtained when the "Ctrl"+"D" keys are pressed as a key-input is displayed, and a fact that "Ctrl"+"S" keys exist as a near valid key-input is displayed.

The OS 21 displays the valid key existence notification screen 40 on the display unit 14 until the timer (not shown) measures a predetermined period of time (e.g., several seconds to several ten seconds). At this time, when the operator checks a check blank 41 set on the notification screen 40 by operating the KBD 15 or the PD 16, a setting can be performed such that the valid key existence notification screen 40 is not displayed in steps subsequent to the next step S13.

Thereafter, when the timer measures the predetermined period of time, the OS 21 closes the valid key existence notification screen 40 to shift the process to step S14.

When the operator inputs a direction to close the valid key existence notification screen 40 before the predetermined period of time has elapsed, the valid key existence notification screen 40 can be closed even though the predetermined period of time has not elapsed to shift the process to step S14.

In step S14, the OS 21 changes the key-input information of the invalid key-input into the valid key-input information detected in step S10 to shifts the process to step S9. When the process shifts to step S9 through step S14, the OS 21 generates an execution command of the function (store file in the example shown in FIG. 10) corresponding to the change valid key-input information and gives the execution command to the application 22-1. At this time, the application 22-1 executes the corresponding function (store file).

When the process shifts to step S15, the OS 21 decides whether key shift information exists for the pressed key or not. More specifically, the OS 21 refers to a key shift information table 42 (see FIG. 11) held in the HD 5*a* to decide whether a certain valid key invalid key-input is allocated to the invalid key-input in advance or not.

As shown in FIG. 11, the key shift information table 42 holds, as key shift information, a record constituted by the key-input information of an invalid key-input and the key-input information (corrected key-input information) of the valid key-input directed as correction of the invalid key-input.

The OS 21 refers to the key shift information table 42 to decide whether key shift information exists for the corresponding invalid key-input or not. When the corresponding key shift information exists (S15; Y), the OS 21 shifts the process to step S17. When the key shift information does not exist (S15; N), the OS 21 shifts the process to step S16.

In step S16, the OS 21 records the key shift information corresponding to the corresponding invalid key-input. More specifically, the OS 21 displays a key shift information setting screen 43 shown in FIG. 12 on the display unit 14 on the basis of the key-input information of the corresponding invalid key-input and the key-input information of a valid key-input belonging to a retrieving area obtained by the process in step S10.

As shown in FIG. 12, on the key shift information setting screen 43, a fact that the key-input is invalid and a plurality of key-inputs belonging to the neighborhood (retrieving area) are displayed. In the example shown in FIG. 12, a fact that valid key-inputs "Ctrl"+"S" (function "store file") and "Ctrl"+"Z" (function "undo") exist for an invalid key-input "Ctrl"+"X" is displayed.

In addition, the key shift information setting screen 43 displays that any one of the plurality of valid key-inputs is directed or selected. In contrast to this, the operator can direct or select any valid key-input displayed on the key shift information setting screen 43 by the KBD 15 or a cursor operation (mouse click or cursor operation+"Enter") of the PD 16.

When the direction or selection is performed by the operator, the OS 21 closes the key shift information setting screen 43. Thereafter, the OS 21 forms new key shift information constituted by the corresponding invalid key-input information and the valid key-input information obtained by the direction or selection and registers the key shift information in the key shift information table 42. In this manner, YES is decided for the invalid key-input "Ctrl"+"X" in this example in step S15. Thereafter, the process shifts to step S17.

In step S17, the OS 21 corrects the key-input information according to the key shift information extracted from the key shift information table 42 in step S15 or the key shift information formed in step S16. More specifically, the OS 21 changes the invalid key-input information into valid key-input information registered as corrected key-input information in the shift information. That is, in the example shown in FIG. 11, the invalid key-input information "Ctrl"+ "X" is changed into the valid key-input information "Ctrl"+ "S".

Thereafter, the process is shifted to step S9, the OS 21 analyzes the function corresponding to the valid key-input information serving as corrected key-input information by using the function retrieving table 35, and gives an execution command corresponding to the function to the application 22-1. In this manner, the application 22-1 executes the function corresponding to the execution command.

As described above, the OS 21 is executed by the CPU 2, and the OS 21 executes the key-input correcting process, so that the deciding means, the changing means, the notifying means, the extracting means, and the specifying means according to the present invention are realized.

The display modes of the first valid key-input notification screen 37, the second valid key-input notification screen 38, the valid key nonexistence notification screen 39, the valid key existence notification screen 40, and the key shift information setting screen 43 can be appropriately set. Each of these screens may be displayed on a work screen (not shown) of the OS 21 or the application 22-1 such that the screen overlaps the working screen or is switched to the working screen.

The function retrieving table 35, the valid key retrieving table 36, and the key shift information table 42 are held in a readable/writable recording medium such as the HD 5a. The image information of the screens 37 to 40 and 43 are held in a recording medium such as the HD 5a.

The key-input correcting process for a shortcut key for executing the function of the application 22-1 has been described in the above example. However, the key-input correcting process is executed for a shortcut key-input for executing the function of another application 22 or the OS itself.

<Operation of Embodiment>

According to the key-input correcting device of the embodiment, in a key-input of a shortcut key, when a combination of pressed keys is an invalid key-input (key-input which is not allocated as a shortcut key), the invalid key-input (key-input information) is changed into the key-input (key-input information) of a shortcut key correlated to the corresponding key-input (existing in a retrieving area) (S14), and the function allocated to the changed shortcut key is executed. An operator (user) is notified that the key-inputs are changed through the display unit 14 and the loudspeaker 18 (S13).

When a plurality of corrected key-input candidates corresponding to a key-input of an invalid shortcut key exist, the corresponding key-input is changed into a corrected key-input specified by a selecting or directing operation of the operator. In this manner, the function corresponding to the key-input of a shortcut key intended by the operator is executed.

As described above, when the operator erroneously inputs a shortcut key, even though the key-input is an invalid key-input, the OS 21 handles the key-input as the key-input of a shortcut key intended by the operator, and the function allocated to the corresponding shortcut key is executed (S9) Therefore, unlike the conventional art, the shortcut key need not be re-pressed, and interruption or delay of an operation caused by re-pressing the shortcut key can be prevented.

When the operator erroneously inputs a shortcut key to press another shortcut key, the OS 21 extracts other shortcut keys correlated to the pressed shortcut key (existing in a retrieving area), and displays the first valid key-input notification screen 37 on the basis of these shortcut keys (S5).

In this manner, the operator can change the key-input of the pressed shortcut key into the key-input of an intended shortcut key. The function allocated to the key-input of the changed shortcut key is executed (S9).

Therefore, the following conventional problem can be solved. That is, a function which is not intended by an operator is executed by erroneously pressing a shortcut key, and restart of the operation is performed by the operator. This method can also prevent the operation from being interrupted or delayed.

<Modification>

In the above example, a key-input correcting process to a shortcut key has been described. However, a combination of keys used as a shortcut key can be appropriately set. A state change key used in a shortcut operation may be an "Alt" key, a "Shift" key, or the like. The key-input correcting process may be executed to a function key.

In the example, in step S16, a valid key-input directed or selected by an operator (user) is recorded on the key shift information setting screen 43 as a corrected key-input. In place of this, when a plurality of valid key-inputs exist, an OS may automatically select any one of the valid key-inputs according to a predetermined priority order and record the valid key-input as corrected key-input information. In addition, the held contents of the key shift information table 42 may be constituted such that the contents can be added, deleted, and changed by an operator (user) independently of the key-input correcting process.

In the embodiment, the OS 21 executes a key-input correcting process. In place of this, the key-input process may be executed by the OS 21 and the applications 22 such that the OS 21 is in cooperation with the applications 22, or the key-input correcting process may be executed such that the applications 22 temporarily uses the function of the OS 21. The applications 22 can also independently execute the key-input correcting process.

In the embodiment, a key-input correcting process is executed by the OS 21 of the computer 1. In place of this, the key-input correcting process may be executed by the KBD 15 (input unit side), and the changed key-input information may be input to the OS 21 (electronic apparatus side). In this case, the electronic apparatus may have a conventional configuration.

In the embodiment, as notifications performed in steps S5, S6, S11, S13, and S16, images and voices are output. However, the voices may not be used. In addition, when an operator depresses a cancel key or button of a key-input in response to a notification, the corresponding key-input may be canceled.

In the embodiment, as key-input correcting processes, a process (S4 to S8) for a valid key-input for making it possible to correct (change) a valid key-input into another valid key-input and a process (S10 to S17) for an invalid key-input for correcting (changing) an invalid key-input into another valid key-input are included. These processes can be separately performed. It may be designed that only one of the process for the valid key-input and the process for the invalid key-input is performed.

According to the key-input correcting device of the present invention, since an invalid key-input is changed into another valid key-input, an operator need not perform a key-input again. For this reason, interruption and delay of an operation can be reduced.

What is claimed is:

1. A key-input correcting device comprising:
   a processing unit performing a first processing for determining whether a first key-input using a function start key for starting execution of a function provided with an electronic apparatus is valid before a second processing, which is based on a key-input, is executed; and
   a changing unit when the first key-input is invalid, changing the first key-input into a valid key-input of the function start key for use by the second processing.

2. A key-input correcting device according to claim 1, wherein the changing unit changes the first key-input into a valid key-input correlated to a key or a button related to the first key-input.

3. A key-input correcting device according to claim 2, wherein, when a plurality of second key-inputs which can be changed with respect to the first key-input exist, the changing unit changes the first key-input into a valid key-input specified from the plurality of second key-inputs.

4. A key-input correcting device according to claim 3, wherein the changing unit holds a combination of the first key-input and the specified second key-input and then changes the first key-input into the specified second key-input.

5. A key-input correcting device according to claim 4, wherein the notifying unit notifies an operator of another key-input changed from the first key-input.

6. A key-input correcting device according to claim 4, wherein the notifying unit notifies an operator of a plurality of second key-inputs which can be changed from the first key-input and that any one is selected from the plurality of second key-inputs.

7. A key-input correcting device according to claim 1, wherein the changing unit changes the first key-input into a valid key-input using a key existing in a predetermined area with respect to a key or a button related to the first key-input.

8. A key-input correcting device according to claim 1, further comprising notifying unit for, when the first key-input is invalid, notifying an operator that the first key-input is invalid.

9. A key-input correcting device according to claim 1, wherein the valid key-input is a key-input to which a function executed in the electronic apparatus is allocated, and the invalid key-input is a key-input to which the function is not allocated.

10. A key-input correcting device according to claim 1, wherein all the key inputs are key-inputs of a shortcut key or a function key.

11. A key-input correcting device comprising:
    an extracting unit, upon detecting a first valid key-input using a function start key for starting execution of a function provided with an electronic apparatus, extracting a second valid key-input using the function start key;
    a specifying unit selecting any one of the first key-input and the extracted second valid key-input; and
    a changing unit, when the second valid key-input is selected, changing the first key-input into the selected second valid key-input.

12. A key-input correcting device according to claim 11, wherein the extracting unit extracts the second valid key-input correlated to a key or a button related to the first key-input.

13. A key-input correcting device according to claim 11, wherein the extracting unit extracts the second valid key-input using a key existing in a predetermined area with respect to a key or a button related to the first key-input.

14. A key-input correcting device according to claim 11, further comprising notifying unit for, when the second valid key-input is extracted, notifying an operator that the second valid key-input is extracted.

15. A key-input correcting method comprising:
    performing a first processing for determining whether a first key-input using a function start key for starting execution of a function provided with an electronic apparatus is valid before a second processing, which is based on a key-input, is executed; and
    when the first key-input is invalid, changing the first key-input into a valid key-input of the function start key for use by the second processing.

16. A key-input correcting method according to claim 15, wherein the first key-input into a valid key-input correlated to a key or a button related to the first key-input.

17. A key-input correcting method according to claim 15, wherein the first key-input is changed into a valid key-input using a key existing in a predetermined area with respect to a key or a button related to the first key-input.

18. A key-input correcting method according to claim 15, wherein, when a plurality of second key-inputs which can be changed with respect to the first key-input exist, the first key-input is changed into a valid key-input specified from the plurality of second key-inputs.

19. A key-input correcting method according to claim 18, wherein a combination of the first key-input and the specified second key-input is held, and then, the first key-input is changed into the specified second key-input.

20. A key-input correcting method according to claim 15, wherein, when the first key-input is invalid, an operator is notified that the first key-input is invalid.

21. A key-input correcting method according to claim 20, wherein an operator is notified of another key-input changed from the first key-input.

22. A key-input correcting method according to claim 20, wherein an operator is notified of a plurality of second key-inputs which can be changed from the first key-input and that any one is selected from the plurality of second key-inputs.

23. A key-input correcting method according to claim 15, wherein the first key-input and the second key-input are key-inputs of a shortcut key or a function key.

24. A key-input correcting method comprising:
    upon detecting a first valid key-input using a function start key for starting execution of a function provided with an electronic apparatus, extracting a second valid key-input using the function start key;
    selecting any one of the first key-input and the extracted second valid key-input; and
    when the second valid key-input is selected, changing the first key-input into the selected second valid key-input.

25. A key-input correcting method according to claim 24, wherein the second valid key-input correlated to a key or a button related to the first key-input is extracted.

26. A key-input correcting method according to claim 24, wherein the second valid key-input using a key existing in a predetermined area with respect to a key or a button related to the first key-input is extracted.

27. A key-input correcting method according to claim 24, further comprising, when the second valid key-input is extracted, notifying an operator that the second valid key-input is extracted.

28. A computer readable recording medium which records a computer program for causing a computer to execute a key-input correcting process, wherein the program causes the computer to execute:

performing a first processing for determining whether a first key-input using a function start key for starting execution of a function provided with an electronic apparatus is valid before a second processing, which is based on a key-input, is executed; and when the first key-input is invalid, changing the first key-input into a valid key-input of the function start key for use by the second processing.

29. A computer readable recording medium which records the program according to claim 28, wherein the program changes the first key-input into a valid key-input correlated to a key or a button related to the first key-input.

30. A computer readable recording medium which records the program according to claim 28, wherein the first key-input is changed into a valid key-input using a key existing in a predetermined area with respect to a key or a button related to the first key-input.

31. A computer readable recording medium which records the program according to claim 28, wherein, when a plurality of second key-inputs which can be changed with respect to the first key-input exist, the first key-input is changed into a valid key-input specified from the plurality of second key-inputs.

32. A computer readable recording medium which records the program according to claim 31, wherein the program holds a combination of the first key-input and the specified second key-input is held, and then, the first key-input is changed into the specified second key-input.

33. A computer readable recording medium which records the program according to claim 32, further comprising, when the first key-input is invalid, notifying an operator that the first key-input is invalid.

34. A computer readable recording medium which records the program according to claim 33, wherein the program notifies an operator of another key-input changed from the first key-input.

35. A computer readable recording medium which records the program according to claim 33, wherein the program notifies an operator of a plurality of second key-inputs which can be changed from the first key-input and that any one is selected from the plurality of second key-inputs.

36. A computer readable recording medium which records the program according to claim 28, wherein the first key-input and the second key-input are key-inputs of a shortcut key or a function key.

37. A computer readable recording medium which records a computer program for causing a computer to execute a key-input correcting process, wherein the program causes the computer to execute:

upon detecting a first valid key-input using a function start key for starting execution of a function provided with an electronic apparatus, extracting a second valid key-input using the function start key;

selecting any one of the first key-input and the extracted second valid key-input; and when the second valid key-input is selected, changing the first key-input into the selected second valid key-input.

38. A computer readable recording medium which records the program according to claim 37, wherein the program extracts the second valid key-input correlated to a key or a button related to the first key-input.

39. A computer readable recording medium which records the program according to claim 37, wherein the program extracts the second valid key-input using a key existing in a predetermined area with respect to a key or a button related to the first key-input.

40. A computer readable recording medium which records the program according to claim 37, further comprising, when the second valid key-input is extracted, notifying an operator that the second valid key-input is extracted.

41. A method of preventing interruption of a computer operation caused by an erroneous key input by a user, the method comprising:

determining if a key input is valid using a function start key for starting execution of a function provided with an electronic apparatus; and notifying the user upon other valid key inputs are probable based on the determined key input.

* * * * *